Feb. 9, 1965 P. E. SHAFER ETAL 3,168,778

MAGNETIC CORE MEMORY ASSEMBLING APPARATUS

Filed March 27, 1962 2 Sheets-Sheet 1

INVENTORS.
PHILIP E. SHAFFER
EUGENE T. WALENDZIEWICZ
JOSEPH W. BIRD
CHARLES WOOLARD

BY Carl Fissell Jr.
AGENT

MAGNETIC CORE MEMORY ASSEMBLING APPARATUS

Filed March 27, 1962 2 Sheets-Sheet 2

INVENTORS.
PHILIP E. SHAFFER
EUGENE T. WALENDZIEWICZ
JOSEPH W. BIRD
CHARLES WOOLARD

BY Carl Fissell Jr.
AGENT

3,168,778
MAGNETIC CORE MEMORY ASSEMBLING APPARATUS

Philip E. Shafer, Holmes, Eugene T. Walendziewicz, Philadelphia, Joseph W. Bird, King of Prussia, and Charles Woolard, Paoli, Pa., assignors to Burroughs Corporation, Detroit, Mich., a corporation of Michigan Filed Mar. 27, 1962, Ser. No. 182,900
8 Claims. (Cl. 29—203)

This invention relates to magnetic core memory apparatus, and more particularly, although not necessarily exclusively, to apparatus for arranging magnetic cores in a manner enabling the threading of one or more operating windings through the bores of the cores in a simple, quick and efficient manner, thus to form a magnetic core memory matrix or array. Still more particularly, the invention has to do with means for automatically orienting a plurality of magnetic cores with their bores in axial alignment thereby avoiding operator error with respect to the decision as to whether to thread or not thread a certain core or cores.

It is an important object, therefore, of the present invention to provide means for aligning a plurality of magnetic cores permitting the simple and efficient threading of operating windings thereon.

Another object of the invention is to enable a relatively unskilled operator to selectively thread operating windings through a plurality of magnetic cores quickly, simply and efficiently.

Still a further object of the present invention is to provide a simple and efficient means for testing magnetic core memory plane wiring arrangements without removal or other handling of the individual cores in the array.

An additional object of the invention is to provide apparatus responsive to punch card information as to which cores are to be threaded for automatically orienting and for axially aligning the bores of a plurality of cores for such threading operation.

In accordance with the foregoing objects and first briefly described, the present invention comprises means for detachably/releasably supporting a plurality of magnetic cores in a row and operably associated with means for selectively moving said cores into and out of axial alignment with one another so that electrical conductors can be threadedly passed through the bores of the axially aligned cores while missing those cores which are not so aligned. The apparatus further includes means for automatically controlling the selective axial alignment of such cores together with means for applying a test and/or sensing signal to the wired cores for checking the operating characteristics of the memory plane as well as the cores associated therewith.

The invention and further features and objects thereof will be best understood in connection with the following description of the illustrated embodiment thereof shown in the accompanying drawings, which are provided for the purpose of illustrating the principles of the invention and not for limitation of the invention.

Figure 1:
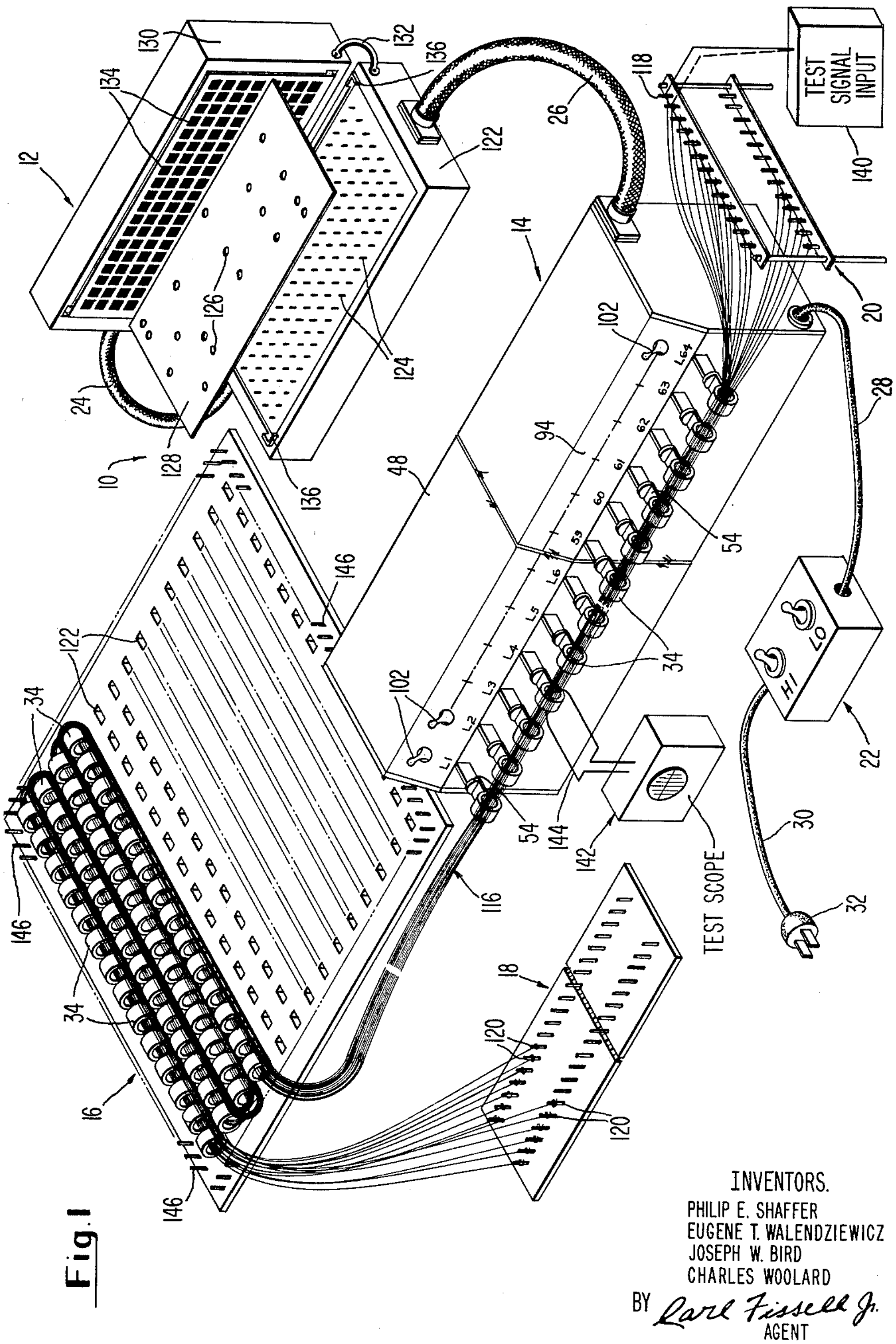
FIG. 1 is a schematic, isometric view of the preferred embodiment of apparatus incorporating the present invention.

Referring to FIG. 1, the present invention hereinafter referred to as a core rope threader 10 in its preferred and illustrated embodiment, is seen to comprise a plurality of sub-assemblies including, a punch card reader 12, a magnetic core positioner 14, a magnetic core memory plane 16, a memory plane test fixture 18, an electrical conductor supporting trellis 20 and, a "high"-"low" current control switch member 22, each of which will be explained in more detail as the description proceeds. The sub-assemblies 12, 14 and 22 are interconnected by means of multi-conductor cables 24, 26 and 28, respectively. Cable 30 and plug 32 together provide means for connecting control member 22 to a source of electrical potential not shown, for applying energizing potentials to the associated apparatus.

The present invention is directed to the fabrication of magnetic core memory planes, such, for example, as those which find employment in electronic computers. In such apparatus toroidal magnetic cores fabricated of various materials such as ferrites or ceramic bobbins wound with magnetizable material are used in large quantities thereby to afford means for storing information or data and are frequently referred to as memory planes. In the present preferred embodiment magnetic core assemblies 34 of the type described and claimed in the U.S. patent application to L. T. La Patka and J. Mayer, Serial No. 704,441, filed December 23, 1957, now Patent No. 3,027,526, entitled "Magnetic Core Assembly," assigned to the same assignee as the present invention, are used to provide the memory plane assembly 16, as will be hereinafter described.

Each of the core assemblies 34 includes a supporting bobbin, not shown, carrying one or more wraps or turns of magnetizable strip material such, for example, as molypermalloy, encapsulated in a body of dielectric material thereby to seal the same from the atmosphere, thus to provide the assembly shown. Each core assembly 34 has an axial bore 35 and includes as an integral part of the encapsulation a projecting tang or tab 36, FIG. 3, thus to provide means for supporting the encapsulated core during handling and/or use, as will appear more clearly hereinafter.

In the memory storage apparatus above referred to, a plurality of encapsulated cores 34 are arranged in rows and columns in a planar assemblage to form the memory matrix array 16. The number of cores 34 varies with the design of the particular memory storage apparatus. One such memory plane consists of sixteen rows and sixteen columns of cores—256 cores in all. Obviously, the size of the memory plane and the number of cores used are a matter of design choice and is limited for the most part by the physical geometry of the apparatus and the available space for housing the same. The memory plane 16 of FIG. 1 is illustrated as a matrix of fourteen rows and fourteen columns of cores—196 cores in all. The number of cores shown is a result of the size of the sheet of drawing and is not to be considered a limitation on the size or operation of the apparatus herein described.

In order to provide a useful memory plane matrix assembly it is also necessary to provide a number of electric conductors or windings therefor. These include, for example, drive and sense windings which are applied in a manner so as to pass through the bores of the cores and to project away therefrom for attachment to certain other associated conductors for interconnection with other computer apparatus. These windings ordinarily are fed, threaded or laced through the bores of the cores of the matrix after the cores have been assembled together into an array of rows and columns. As a result, the application of these windings to the cores is slow, tedious, frought with operational decisional errors as to which cores should or should not have windings, and is relatively costly by virtue of the time consuming nature of the hand work necessarily involved.

The present application overcomes these problems in a novel manner enabling an unskilled operator to first produce a "rope" of cores of a desired number of disposition in a matrix or memory plane and thereafter provides a convenient means for checking each core in the resulting memory plane as well as the plane itself in a simple, quick and efficient manner.

Figures 2, 3:
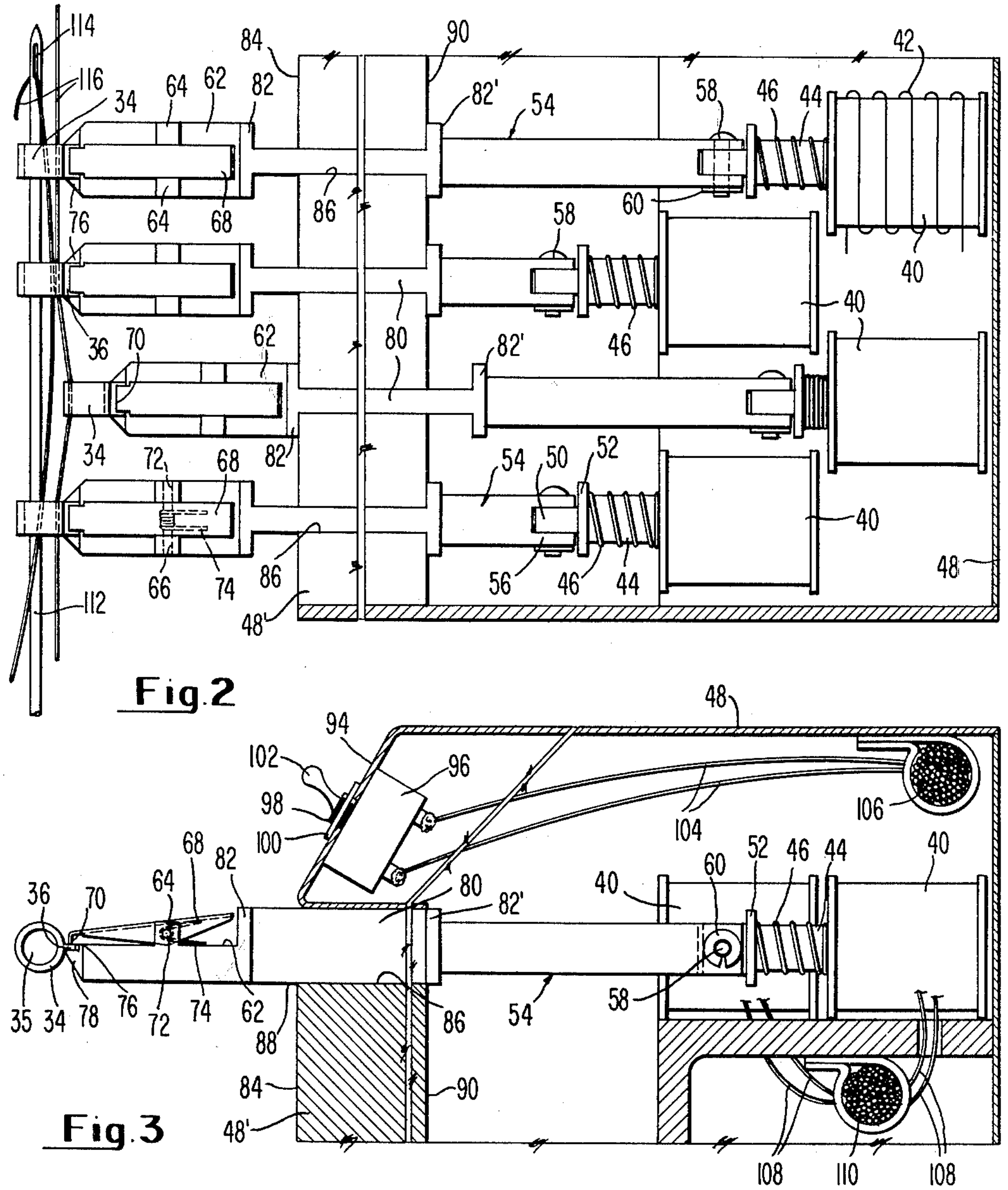
FIG. 2 is a top plan view of a portion of the core supporting apparatus of FIG. 1 with portions of the apparatus removed to expose the interior to view.
FIG. 3 is an elevational view of the apparatus shown in FIG. 2.
Figure 4:
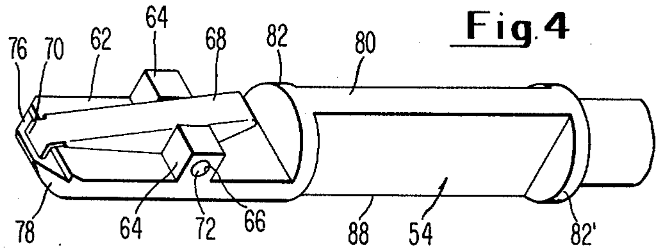
FIG. 4 is an isometric detail view of the magnetic core supporting member shown in side elevation in FIG. 3.

The means for effecting the foregoing is seen by reference to the drawings, to include the card reader 12 and the core positioner 14, as will now be described in detail. Referring to FIGS. 2, 3 and 4, it is seen that a plurality of signal responsive electromagnetic members 40, such, for example, as plunger type solenoids, each provided with a plurality of electrical windings 42 thereon, and a reciprocably, slidably movable plunger member 44, biased away from the base of the solenoid by means of an associated spring 46. For purposes of increasing the overall packing density and reducing size the solenoids 40 are disposed in two staggered or offset parallel rows on a supporting frame 48—48′ in a known manner. The forward end (leftward, FIG. 2) of each plunger 44 is provided with a reduced portion 50, adjacent a flange 52 against which the spring 46 is received and retained. Each solenoid is operably associated with an individual, slidably movable core selecting rod 54 which is provided at one end with a bifurcated portion 56 for attachment to portion 50 of each plunger 44 as by means of a short pin 58 and a C-ring 60. The opposite end of each rod 54 is provided with an integral, slightly elongated, flattened member 62 including a pair of oppositely disposed upstanding projections 64 each having a bore 66 therethrough. A rockable clip 68 having a bent down jaw portion 70 is pivotally supported between opposite projections 64 by means of a pin 72 which projects through the axially aligned bores 66. A spring 74 carried by the pin 72 biases each clip in a direction such that the jaw portion 70 is normally pressed tightly against an undercut ledge 76, FIGS. 3 and 4, of the forward tapered portion 78 of each member 54.

As seen more particularly in FIGS. 2 and 3, each of the rods 54 is provided with a narrow shank 80 extending between the adjacent stop portions 82—82′ for purposes to be explained later on herein. The left upstanding wall portion 84 of member 48′ is provided with a plurality of grooves or slots 86 cut or otherwise formed therein in comb-like fashion, into which the narrowed shanks 80 of members 54 are received for sliding movement leftwardly and rightwardly. Each slot 86 provides a bearing surface for the lower edge 88 of each member 54 while at the same time being of a prescribed width or thickness, as seen in FIG. 2, to constrain the members 54 in their leftward-rightward excursions as automatic or manual core selection is hereinafter accomplished. In one condition of solenoids 40, stop 82′ abuts the inward edge 90 of the wall 84 while in another condition of the solenoids the stop 82 abuts the outward edge of the wall 84.

The front portion 94 of the frame or cover 48 of the member 14 is angled or canted rightwardly, FIG. 3, slightly, as shown, and includes a plurality of individual toggle switches 96, e.g., single-pole, single-throw switches of conventional type, which are secured in apertures in the canted portions of the cover in a known fashion as by means of the threaded portion 98 of the switch and the attaching nut 100, leaving the toggle 102 projecting angularly forwardly for easy accessability to an operator. Electrical leads or conductors 104 from each of the switches are wired into a cable 106 for interconnection with the solenoid coils 42 of each of the solenoids 40. Conductors 108 from the latter are likewise wired into a cable 110 for interconnection with the reader member 12 and the control member 22, as hereinafter described.

With all of the switches 96 in the "off" or deenergized condition the springs 46 bias the rods 54 leftwardly to cause stops 82′ to abut wall 90 thereby aligning members 62, as seen in FIG. 1. Encapsulated cores 34 are clamped by means of the tabs 36 between the jaw 70 and the ledge 76 with bore 35 in axial alignment. Preselected switches 96 are now switched "on" energizing certain corresponding solenoids 40 causing their respective associated plungers 54 to retract rightwardly, displacing certain cores from their original axially aligned positions to that shown, for example, by the position of the third core from the top in FIG. 2.

An elongated shuttle member such as a rigid plastic or metal needle 112 has its eye 114 threaded with a conductor 116 of suitable length and cross section. Thereafter an operator may thread such conductor through the aligned bores of the cores easily and quickly. One end of the conductor is attached to the trellis 20 in a known manner as by retaining the wire with a clip (not shown) which may be permanently attached to each one of the upstanding projections 118 thereafter identifying each conductor for future electrical testing etc. The opposite end of the conductor is attached to the contacts 120 of test panel 18. The needle shuttle is thereafter supplied with another electrical conductor 116 and the operation aforedescribed is repeated with either the same or different cores, as designated or called for by reason of the positions of switches 96 in accordance with the equipment design. This operation is repeated until a sufficient number of electrical conductors have been threaded through the various cores. Thereafter, the entire string or as it may now be characterized rope of cores is released from the core positioner 14 as by depressing the inward end of each clip 68. The core rope is then strung back and forth along the dielectric panel board 16, FIG. 1 (upper left) with the tab 36 of each core 34 disposed in a respective aperture 122 as by being press-fitted therein.

The employment of a human operator entails certain decisional problems which in turn tend to produce a certain predictable amount of decisional error. For example, the operator may transpose the number of the core which is to be threaded and inadverently insert a conductor through the bore of a core which should be bypassed. In such case the core rope becomes useless without first removing the erroneously threaded conductor or core therefrom.

In order to eliminate such operational decisional errors the present apparatus includes the punch card reader 12 which is or may be substantially similar to the "Punched Card Reader and Switch Contact" apparatus described and claimed in the application of John K. Brown, Serial No. 139,446, filed September 20, 1961, and assigned to the same assignee as the present invention. The drawing of FIG. 1 is obviously schematic and therefore does not include all of the structural elements which are actually used or employed in such a device. However, it is believed that sufficient structure has been disclosed and shown to enable one skilled in the art to understand the operation of such equipment. The reader 12 includes a base member 122 including a plurality of rows and columns of upwardly projecting conductors 124 which are or may be spring biased in a vertical direction and have sufficient height to be received through certain of the apertures 126 in a typical punched card 128.

A lid or cover member 130 secured to the base by means of the hinge 132 is provided with a plurality of electrically conductive pads 134 forming an electrically common ground plane for the apparatus. The pads 134 are electrically interconnected with the solenoid cores 42 by means of the cables 24 and 26, aforementioned. A pair of short upstanding right angle members 136 located in opposite diagonal corners of the base 122 provide orienting means thereby preventing the card 128 from being accidentally dislodged from the assembly during use.

In operation a card 128, pre-punched with the desired core position data, is inserted into the card reader. The lid is closed completing electrical circuits to various pins in a known manner. In order to avoid excessive currents and high voltages, the windings of the solenoids are energized first with a low voltage in the order of 60 volts by the closure of the switch identified as "low" in control member 22. All of the selected solenoids are affected but only a small number will be activated. Thereafter the momentary contact switch identified as "high" is closed placing approximately 120 volts on the coils 42 of the solenoids causing the rod members 54 of the remaining selected solenoids to retract, FIG. 2. This is to assure 100% activation of the selected solenoids. In the manner earlier described herein, the operator conveniently may now thread conductors 116 through the axially aligned cores without thought as to which cores should receive such windings. Those cores which are not to receive the windings, i.e., those bypassed, are retracted out of the way of the axially aligned row of cores. Thus there is no danger that the operator may inadvertently apply a winding to a core which should not receive the same. In this manner a simple and efficient means is provided avoiding the tremendous number of thread-no thread decisions which may amount to as many as 250,000 in certain memory plane designs thereby eliminating the opportunity for operational decisional error.

As a means of testing the cores and planes, a test signal from a source 140 may be introduced into each "rope" conductor by means of the trellis contacts 118. An oscilloscope 142 may be connected to each core by means of a conductor loop 144 permitting the signal to be sensed and visibly displayed and observed in a known manner.

Once such checking is completed, the group of cores is moved as by sliding leftwardly, FIG. 1, along the wires away from the core positioner 14 and the "rope" positoned on the plane 16 as aforedescribed. New cores are then loaded into the positioner in the manner hereinbefore referred to and the threading operation continued as before until the desired core total is reached e.g., 64, 128, 256, etc. With each additional group of 64 cores, the free end, that end attached to fixture 20 of the wire is removed from the fixture and is threaded through the desired core combination. Thereafter the badly flexed wires adjacent the positioner 14 are cut and removed from the assembly thereby assuring good reliability. The individual conductors 116 are detached from the test fixture 18 and thereafter secured to the contacts 146 disposed around the periphery of the plane 16. The memory plane is now ready for assembly with other memory planes to form a stack up for use in a computer.

What is claimed is:

1. Magnetic core memory plane apparatus comprising,
(*a*) means mounting a plurality of magnetic core members for movement in two opposite directions normal to said mounting means;
(*b*) means operably associated with said mounting means for effecting said movement;
(*c*) means controlling said last means in a manner to axially align the bores of said cores, and,
(*d*) selection means operably interconnecting said controlling means and said core moving means for effecting selective alignment of certain ones of said plurality of magnetic cores.

2. Magnetic core memory plane apparatus comprising,
(*a*) means mounting a plurality of magnetic core members in a row in spaced apart side by side relation for movement in two opposite directions normal to said mounting means,
(*b*) means operably associated with said mounting means for effecting movement thereof,
(*c*) means controlling said last means in a manner to axially align the bores of said cores, and,
(*d*) selection means operably interconnecting said controlling means and said core moving means for effecting selective alignment of certain ones of said plurality of magnetic cores.

3. Magnetic core memory plane apparatus comprising,
(*a*) means detachably mounting a plurality of magnetic core members in a row for movement normal to the mounting means,
(*b*) signal responsive means operably associated with said mounting means for effecting said normal movement,
(*c*) means for electircally energizing said signal responsive means in response to core selection signals whereby to axially align the bores of said cores, and,
(*d*) means including means providing pre-arranged core selection information operably associated with said energizing means and said signal responsive means for effecting automatic selective alignment of the bores of certain ones of said magnetic cores for application thereto of electrical windings.

4. Magnetic core memory plane apparatus comprising,
(*a*) means detachably mounting a plurality of magnetic core members in rows for movement normal to the mounting means,
(*b*) electromagnetic means operably associated with said mounting means for effecting said normal movement,
(*c*) means for electrically energizing said electromagnetic means in response to core selection information signals whereby to axially align the bores of said cores, and,
(*d*) means including means providing pre-arranged core selection information operably associated with said energizing means and said electromagnetic means for effecting automatic selective alignment of the bores of certain ones of said magnetic cores for application thereto of electrical windings.

5. Magnetic core memory plane apparatus comprising,
(*a*) means for detachably mounting a plurality of magnetic core members in an elongated row,
(*b*) a plurality of signal responsive members disposed in rows adjacent said mounting means,
(*c*) means interconnecting said core mounting means and said signal responsive means for effecting movement of said core mounting means normal to said signal responsive means when said signal responsive means is energized,
(*d*) means for selectively actuating said signal responsive means,
(*e*) means for controlling said selective actuating means, and,
(*f*) means for applying an energizing potential to said selective actuating means to energize said signal responsive means and selectively orient said mounting means in a predesired arrangement.

6. Magnetic core memory plane apparatus comprising,
(*a*) means for detachably mounting a plurality of magnetic core members in an elongated row,
(*b*) said mounting means including a spring biased member for releasably securing a magnetic core to said mounting means,
(*c*) a plurality of signal responsive members disposed in rows adjacent said mounting means,
(*d*) means interconnecting said core mounting means and said signal responsive means for effecting movement of said core mounting means normal to said signal responsive means when said signal responsive means is energized,
(*e*) means for selectively actuating said signal responsive means,
(*f*) means for controlling said selective actuating means, and,
(*g*) means for applying first a low level and then a high level of electrical energizing potential to said selective actuating means to energize said signal responsive means for selectively orienting said mounting means in a predesired arrangement.

7. Magnetic core memery plane apparatus comprising, (*a*) means for detachably mounting a plurality of magnetic core members in an elongated row, (*b*) a plurality of signal responsive members arranged in two rows adjacent said mounting means, (*c*) means interconnecting said core mounting means and said signal responsive means for effecting movement of said core mounting means normal to said signal responsive means when said signal responsive means is energized, (*d*) punch card switch means for selectively actuating said signal responsive means, (*e*) punch card means for controlling said selective actuating means, and, (*f*) switch means for applying an energizing potential to said selective actuating means thereby to energize said signal responsive means and selectively orient said mounting means in a predesired arrangement.

8. Magnetic core memory plane apparatus comprising, (*a*) means for detachably mounting a plurality of magnetic core members in an elongated row, (*b*) a plurality of signal responsive members arranged in two staggered rows adjacent said mounting means, (*c*) means interconnecting said core mounting means and said signal responsive means for effecting movement of said core mounting means normal to said signal responsive means when said signal responsive means is energized, (*d*) punch card switch means for selectively actuating said signal responsive means, (*e*) punch card means for controlling said selective switch actuating means, (*f*) switch means for applying an energizing potential to said selective actuating means thereby to energize said signal responsive means and selectively orient said mounting means in a predesired arrangement, and, (*g*) manually operable switch means operably associated with said punch card switch means for overriding the latter for manually actuating said signal responsive means in a desired manner.

References Cited in the file of this patent

UNITED STATES PATENTS

| | | |
|---|---|---|
| 2,355,832 | Wagner | Aug. 15, 1944 |
| 2,958,126 | Shaw | Nov. 1, 1960 |
| 2,985,948 | Peters | May 30, 1961 |